(12) United States Patent
Hailpern et al.

(10) Patent No.: US 8,312,058 B2
(45) Date of Patent: Nov. 13, 2012

(54) METHOD OF PROVIDING ELEMENT DOSSIERS THAT INCLUDE ELEMENTS FROM NONADJACENT LIFECYCLE PHASES

(75) Inventors: Brent T. Hailpern, Katonah, NY (US); Peter K. Malkin, Ardsley, NY (US); Peri L. Tarr, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 532 days.

(21) Appl. No.: 12/551,959

(22) Filed: Sep. 1, 2009

(65) Prior Publication Data
US 2011/0055286 A1    Mar. 3, 2011

(51) Int. Cl.
*G06F 7/00* (2006.01)
*G06F 17/30* (2006.01)

(52) U.S. Cl. ...................................................... 707/804
(58) Field of Classification Search ................... None
See application file for complete search history.

(56) References Cited

U.S. PATENT DOCUMENTS

| | | | |
|---|---|---|---|
| 6,256,773 B1 * | 7/2001 | Bowman-Amuah | 717/121 |
| 6,633,878 B1 * | 10/2003 | Underwood | 1/1 |
| 7,774,388 B1 * | 8/2010 | Runchey | 707/811 |
| 2003/0058277 A1 * | 3/2003 | Bowman-Amuah | 345/765 |
| 2003/0187821 A1 * | 10/2003 | Cotton et al. | 707/1 |
| 2006/0085374 A1 * | 4/2006 | Mayes et al. | 707/1 |
| 2007/0016614 A1 * | 1/2007 | Novy | 707/104.1 |

* cited by examiner

*Primary Examiner* — Loan T Nguyen
(74) *Attorney, Agent, or Firm* — Scully, Scott, Murphy & Presser, P.C.; Louis J. Percello, Esq.

(57) ABSTRACT

Providing element dossiers may include obtaining records of relationships between elements from all lifecycle phases of interest, and querying and retrieving a list of all elements related to a target element using the relationship records including relationships between intermediary adjacent lifecycle phases. The method also includes determining inferential and correlation based relationships among dynamically changing elements.

24 Claims, 5 Drawing Sheets

METHOD OF PROVIDING ELEMENT DOSSIERS THAT INCLUDE ELEMENTS FROM NONADJACENT LIFECYCLE PHASES

BACKGROUND

The present disclosure generally relates to method of providing element dossiers that include elements from nonadjacent lifecycle phases.

For a given element or artifact in a given lifecycle phase one can obtain a list of those elements in the same phase that are related. For example, for a given code element, one can retrieve the code it calls, or even the code that calls it (e.g., using IBM's Websphere Studio Application Developer (WSAD) Integrated Development Environment (IDE)). One can also retrieve related elements from adjacent lifecycle phases, e.g., for a given hardware element, like a computer chip, one can obtain the designs upon which it was based, or the product which contain instances of it. However, it is not so easy to answer queries which involve elements of nonadjacent lifecycle phases or obtain a complete description of a given element, which contains data from nonadjacent lifecycle phases, e.g., earlier and/or later. For example, information for a particular piece of code such as, the (earlier) requirements which led to it, or all the (later) bug reports it caused, not only a list of all such earlier and later elements, but also the string of relationships linking them to initial target element, are not readily available or obtainable.

BRIEF SUMMARY

A system and method for providing elements dossiers are provided. The system, in one aspect, may include one or more memories and one or more life cycle records in the one or more memories, each life cycle record describing a life cycle in a work project. The system may also include one or more artifact description records in the one or more memories, each artifact description record describing an artifact in the life cycle, at least one of the artifacts being a dynamic artifact. The system may farther include one or more relationship records in the one or more memories. Each relationship record may be associated with a relationship between at least two of the artifacts and at least one of the relationship records describes a dynamic relationship. An inference engine determines a dossier that includes one or more relationships associated with a target artifact and all of the relationships associated with one or more other artifacts that have a common path of relationships with the target artifact.

A method of providing elements dossiers, in one aspect, may include retrieving one or more life cycle records from one or more memories. Each life cycle record describes a life cycle in a work project. The method may also include retrieving one or more artifact description records from the one or more memories. Each artifact description record describes an artifact in the life cycle and at least one of the artifacts may be a dynamic artifact. The method may further include retrieving one or more relationship records from the one or more memories. Each relationship record may be associated with a relationship between at least two of the artifacts, and at least one of the relationship records may describe a dynamic relationship. A dossier is determined that includes one or more relationships associated with a target artifact and all of the relationships associated with one or more other artifacts that have a common path of relationships with the target artifact.

A program storage device readable by a machine, tangibly embodying a program of instructions executable by the machine to perform methods described herein may be also provided.

Further features as well as the structure and operation of various embodiments are described in detail below with reference to the accompanying drawings. In the drawings, like reference numbers indicate identical or functionally similar elements.

DETAILED DESCRIPTION

A system and method of the present disclosure in one embodiment returns a list of elements related to a given target element. These retrieved elements that are related to a given target element may be those from lifecycle phases that are not adjacent to the target element. The list of related elements may be formatted as one or more reports in one embodiment. Data associated with the retrieved elements may be also retrieved and provided. The retrieved data may include, but not limited to, a description of the interrelationships between all of the retrieved or returned elements. The retrieved data may also include indication of whether any given returned elements preceded or followed the target element chronologically. Relationships or interrelationships may include an indication or a degree of "sureness," e.g., absolutely connected, possible connected or were once connected.

A dossier is a specific "view" on an ongoing project, people, process, and/or others, customized for a particular person in a particular role for a particular purpose. A dossier may be a live, evolving, adaptive collection of gathered and synthesized information regarding an area of concern, for instance, based on one or more evolving lifecycle slices. Lifecycle slices may be created based on three basic kinds of information: definite, physical relationships among entities; inferred, probabilistic relationships, determined by inspection of entities; synthesized relationships, based on observed correlations over time.

In a simple example dossier scenario for "ABC" coming on as a new member of "XYZ" team assigned to work on a couple of components, the dossier might show (among other things):

Structure of the XYZ system around the parts ABC will work on;

Other members who (that) are working on places "nearby" or "related" to the XYZ system;

Anomalies ABC should be aware of (e.g., that there are no test cases associated with one of the components ABC would be working on);

Bug report trend recently or since the last release.

Adjacent lifecycle phases are those whose elements are directly related. For example:

Requirement phase and design phase are directly related and considered as being adjacent lifecycle phase because requirements from the requirement phase lead to designs in the design phase;

Design phase and coding phase are directly related and considered as being adjacent lifecycle phase because designs from the design phase lead to code in the coding phase. Nonadjacent lifecycle phases are those whose elements are only related via the relationships of elements of intermediary adjacent lifecycle phases. For example:

Requirement phase and coding phase are considered to be nonadjacent life cycle phases because requirements from the requirement phase leads to designs in the design phase, which in turn, lead to code in the coding phase;

Intra-phase artifact relationships may also be used in relating elements from nonadjacent lifecycle phases. For example, "X" requirements phase is related to "Y" coding phase because:

1. X requirements phase developed requirement R1 requirements phase;
2. R1 requirements phase led to design D3 design phase;
3. D3 design phase led to the development of C5 coding phase; and
4. C5 coding phase was written by Y coding phase.

Figure 1:
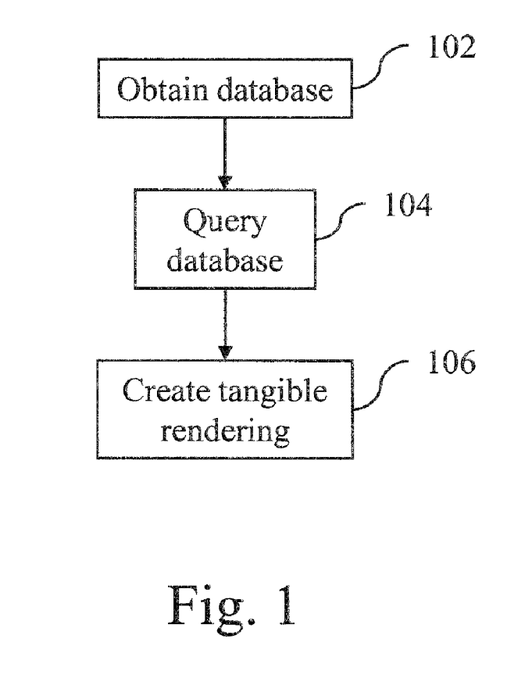
FIG. 1 illustrates a method of providing a list of elements related to a given target element in one embodiment of the present disclosure.

FIG. 1 illustrates a method of providing a list of elements (also referred to as an element dossier), for example, including those from nonadjacent lifecycle phases, related to a given target element in one embodiment of the present disclosure. A given target element may be a code, a phase in a life-cycle of code or project development, or the like. A target element may be provided by a user as a parameter or an input to a program module. Any other methodologies may be used to determine or select a given target element. At 102, a cross-lifecycle database may be obtained which includes relationships between elements from all lifecycles phases of interest. A cross-lifecycle database refers to database or data store that includes information related to projects and lifecycle phases of the projects. A cross-lifecycle database, for example, may exist in on one system or distributed across many systems. In one aspect, an automated computer module or software or the like executing on a processor may access and retrieve the relationships from the cross-lifecycle database. The relationships may be stored in a structured format readable by such computer module. At 104, the cross-lifecycle database is queried and a list of all those elements related to the given target element are retrieved. This may be performed by using the cross-lifecycle database's knowledge of the relationships between intermediary adjacent lifecycle phases, which may be stored as structured data in the database. Database may be queried and elements retrieved using an automated computer module or software or the like.

At 106, a tangible rendering may be provided. The tangible rendering can take many different forms, and this disclosure does not limit to any one rendering. Some examples of the rendering may include a display of the chains of related elements, e.g., textually, graphically and/or any other way. The tangible rendering, for example, may be a network with the nodes representing the elements and the links representing node-interrelationships.

An example of a chain is:
requirement_12→design_32→java_class_13.

The examples here use java_class_13 as a given target element.

The tangible rendering may also include a display of how a given element is related to its adjacent elements, e.g.:

requirement_12→$^{MOTIVATED}$→design_32→$^{USED\_AS}$ $_{BASIS}$$^{FOR}$→java_class_13.

The tangible rendering may also include an indication of whether the given elements preceded or followed the given target element chronologically (e.g., direction of arrow here indicates chronological order (earlier later), e.g.:

java_class_13→application_99→bug_report_666

A selected symbol may be used to represent node interrelationships and indicate whether a given relationship occurred before (=>) or after (→) the target elements, e.g., in the case where java_class_13 is the target element:

req_12=>design_32=>java_class_13→app_45→bug_report_666

The tangible rendering can indicate Boolean combinations (i.e., two or more elements combined with a Boolean operator), e.g.:

OR(Bob, Carol, Ted, Alice)=>req_12=>design_32=>java_class_13

AND(cost_req_32, functional_req_24)=>design_32=>java_class_13

A user may be given an option to restrict the elements to be retrieved. For example, the retrieving of elements may be based on a temporal factor, e.g., only show element created since a given date, show those elements that were created or edited by a given creator or editor, show only those elements that are in some way related to a particular element (e.g., "retrieve all bug reports that are in any way related to requirement_36"). Other restrictions or selection factors may apply.

The lifecycle elements can include but are not limited to requirement documents, design documents, code, text, diagrams, tests, bug reports, users (e.g., employees, managers, customers, third parties (e.g., a software development firm)), multimedia, comments, beta-data annotations to other elements, analysis of other elements, hardware, services, hybrid compound objects (products), i.e., ones including both software and hardware, people, and roles. These elements may be accessed using hyperlinks, the Unified Modeling Language (UML) of software designs, the directory of test cases, computer-aided design and computer-aided manufacturing (CAD/CAM) renderings of hardware designs, video recordings (e.g., of test executions), audio recordings, footnotes or cross-references to text sections In one aspect, the present disclosure also includes creating a cross-lifecycle database. A cross-lifecycle database may be created, for example, by obtaining all of the relevant elements, obtaining all relevant lifecycle phases, determining the lifecycle phase for each element, and determining the relationships between the elements, both elements of the same lifecycle phase and of adjacent lifecycle phases. The information for creating the cross-lifecycle database may be retrieved from previously stored or recorded project information or obtained from a user.

In another aspect, a new element may be added to the cross-lifecycle database, for example, by obtaining the new element, determining the element's lifecycle phase, and determining any and all intra-phase and inter-adjacent-phase relationships between the new element and existing elements. The element and and all of these relationships may be added into the cross-lifecycle database. The new element may have been dynamically added to the project.

Relationships and/or derived relationships may be added between elements of nonadjacent elements to the cross-lifecycle database, for example, whenever such relationships become known. For example, since requirement ABC leads to design XYZ, and design XYZ was used to write component PQR, requirement ABC is related to component PQR. The derived relationships may be also added between elements of adjacent lifecycle phases, or even a single phase, if the derivation includes elements from nonadjacent lifecycle phases. For example, X requirements phase is related to Y requirements phase because:

X requirements phase wrote requirement ABC requirements phase,

Requirement ABC requirements phase lead to design QWE design phase,

Design QWE design phase lead to code component PQR coding phase,

Component PQR coding phase caused bug FED testing phase,

Bug FED testing phase lead to new requirement HIJ requirements phase, and

HIJ requirements phase, was written by Y requirements phase.

Figure 2:
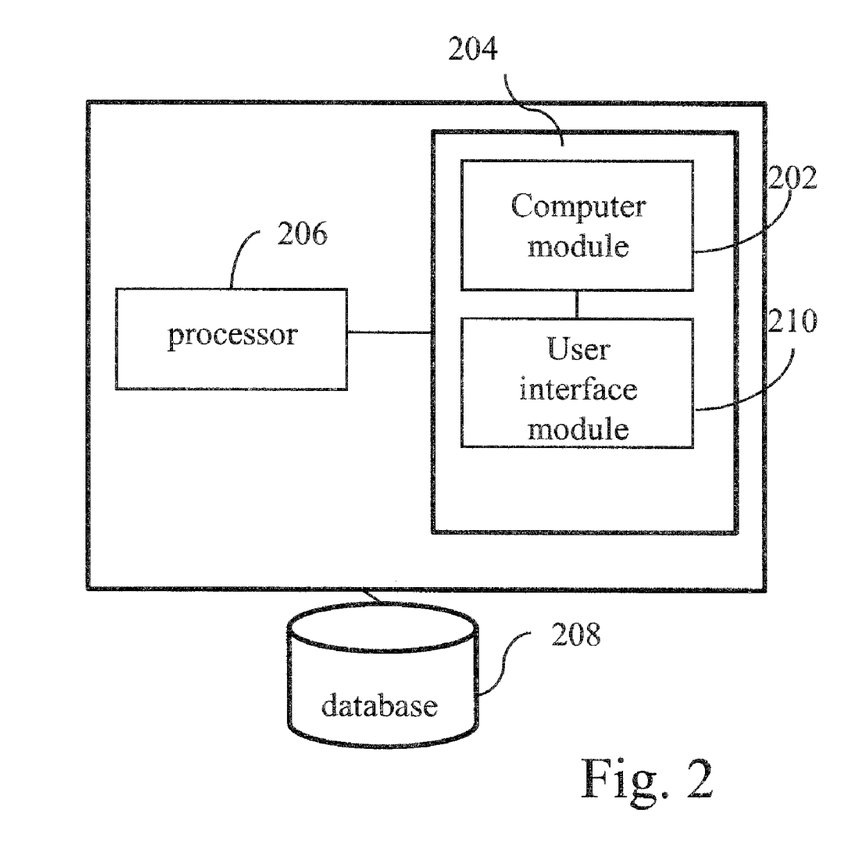
FIG. 2 illustrates example components of the system of the present disclosure in one embodiment.

The derived relationships may include those retrieved from the cross-lifecycle database during the retrieving step in FIG. 2. The derived relationships in one embodiment may be explicitly identified as be derived in the cross-lifecycle database (e.g., setting their "derived" column value or the like to TRUE). A given derived relationship's derivation (i.e., history or logic behind the derivation) may be associated with the given derived relationship, and the association may be stored in the cross-lifecycle database.

If there are conflicts between the existing derived relationship and new ones, for example, resulting from the addition of a new element, the conflicts may be resolved, for example, by identifying a conflict (e.g., determining that an existing derived relationship conflicts or contradicts a relationship determined with a newly added element, and deleting the given derived relationship from the cross-lifecycle database. The contradicting derived relationship may be a chain of derived relationships.

In yet another aspect, a given element may be deleted from the cross-lifecycle database, for example, by obtaining the given element to delete, determining the element's lifecycle phase, and determining any and all intra-phase and inter-adjacent-phase relationships between the to be deleted element and existing elements. The elements and all of these relationships from the cross-lifecycle database may be then deleted. If an element is to be deleted, all derived relationships that are fundamentally based on (i.e., relationships that could not be derived from other exiting relationships) one or more of the deleted relationships, may be determined and deleted from the cross-lifecycle database.

The cross-lifecycle database may have its data updated for those entries relevant to the query when the query is evaluated. The adding, deleting, and/or updating may be performed dynamically.

In another aspect, a user may be enabled to subscribe to a given query so that they are notified whenever new matches appear. For example, a user may post a given query (to cross-lifecycle database), indicating that they want dynamic updates. The cross-lifecycle database receives modification of its elements and associations. The cross-lifecycle database recalculates the results of the query and sends the subscribed user the latest result set. The user may be able to choose a query from a set provided by the cross-lifecycle database. The cross-lifecycle database may send subscribed users updates by RSS/Atom feeds. In addition, the cross-lifecycle database may maintain a history of the previous result set returned to the user, and only send a newly calculated result set if it differs from the previous set.

The method described above may be implemented as a computer program module to include a user interface that allows for user interactions, i.e., inputting values by the user for the computer program module to use and/or outputting values by the computer program module the user to observe. FIG. 2 illustrates example components of the system of the present disclosure in one embodiment. A computer module 202 may be stored in memory 204 and run or executed on a processor 206 having one or more central processing units and/or cores or the like. The computer module 202 may interact with a cross-lifecycle database 208, for example, as described above, perform its functions. A user interface module 210 may be a part of or separate from the computer module 202 and enables the interaction between the computer module 202 and a user.

Figure 4:
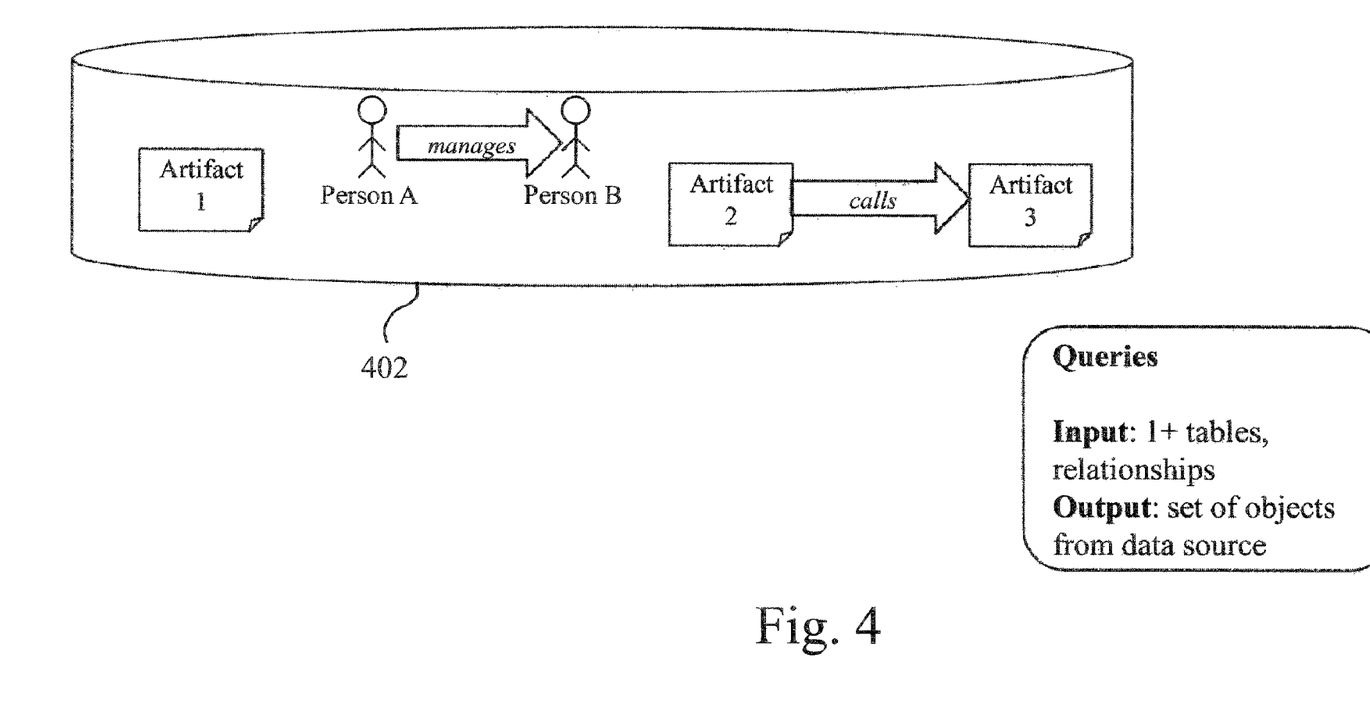
FIG. 4 illustrates lifecycle slices created based on definite physical relationships among entities, which may be discovered with data, for example, in data sources.

As described above, a dossier is information based on one or more evolving lifecyle slices. FIG. 4 illustrates lifecycle slices created based on definite physical relationships among entities, which may be discovered with data, for example, in data sources. One or more data sources 402, for examples, databases, content management systems (CMSs), warehouses, and others, may include artifacts and actors and various associated information. This type of datasource-level information is generally static and slow-changing, and provides information on definite relationships among the artifacts and the actors, and ways to infer or deduce definite relationships. For instance, using the data store, it may be possible to discover artifact relationships, e.g., foo( ) calls bar( ), both foo( ) and bar( ) being artifacts, person A manages person B, etc.

Figure 5:
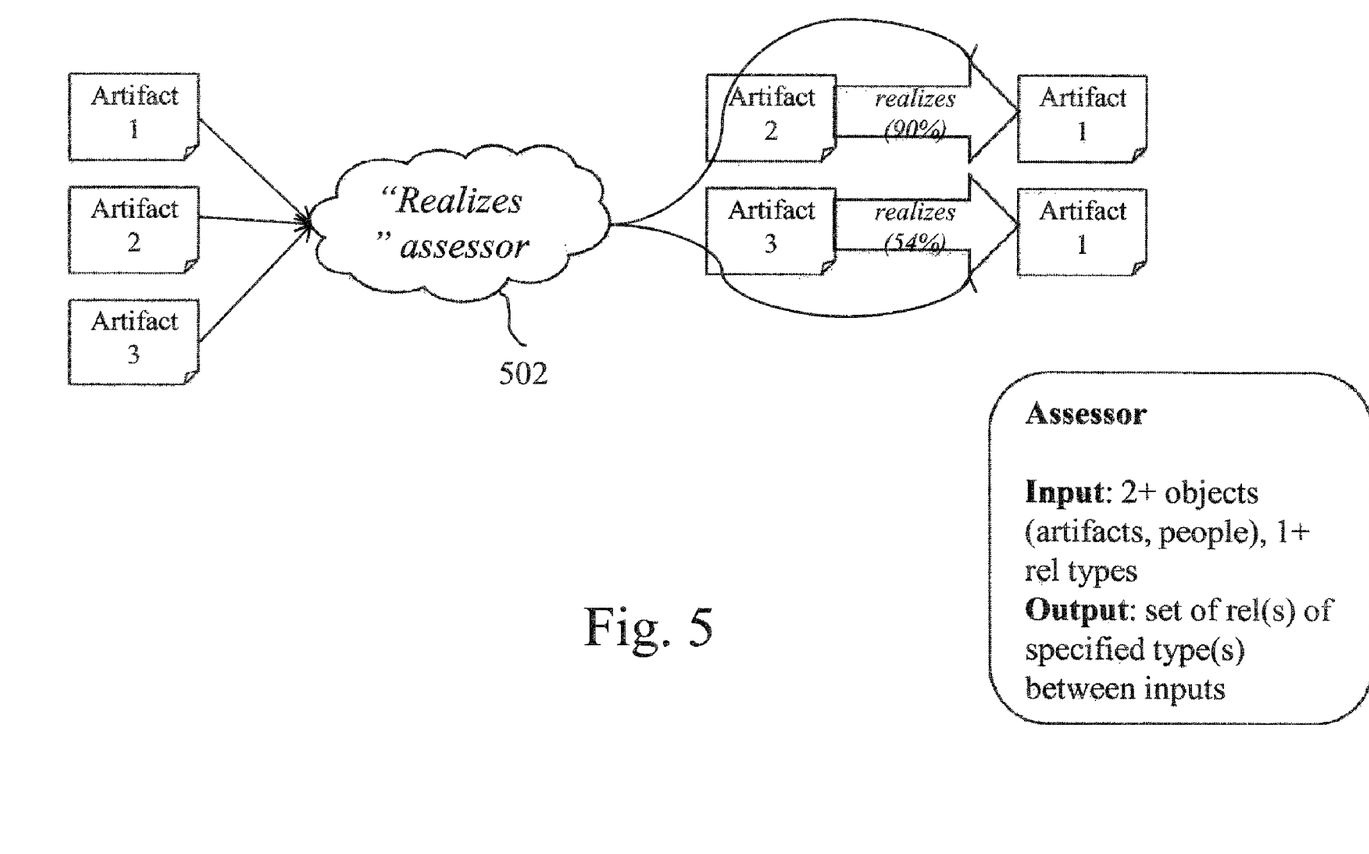
FIG. 5 illustrates inferred relationships.

FIG. 5 illustrates inferred relationships. Inferred relationships are generally rapidly changing and may be less-than-certain. Inferred relationships may be detected based on the similarities in characteristics or behaviors of artifacts and/or actors. For instance, if artifact 1 (e.g., a design of a project) and artifact 2 (e.g., code implementing a project) have similar names, it may be inferred that they are likely related. Inferred relationship information may be rapidly changing, for example, too fast to ask for human intervention upon each change. An assessor 502 (e.g., an automatic computer program) may be employed to discover inferred relationships. The confidence level for the actual existence of the inferred relationship may be expressed as probabilities. Human may use or filter the probabilities based on individual tolerance levels.

Figure 6:
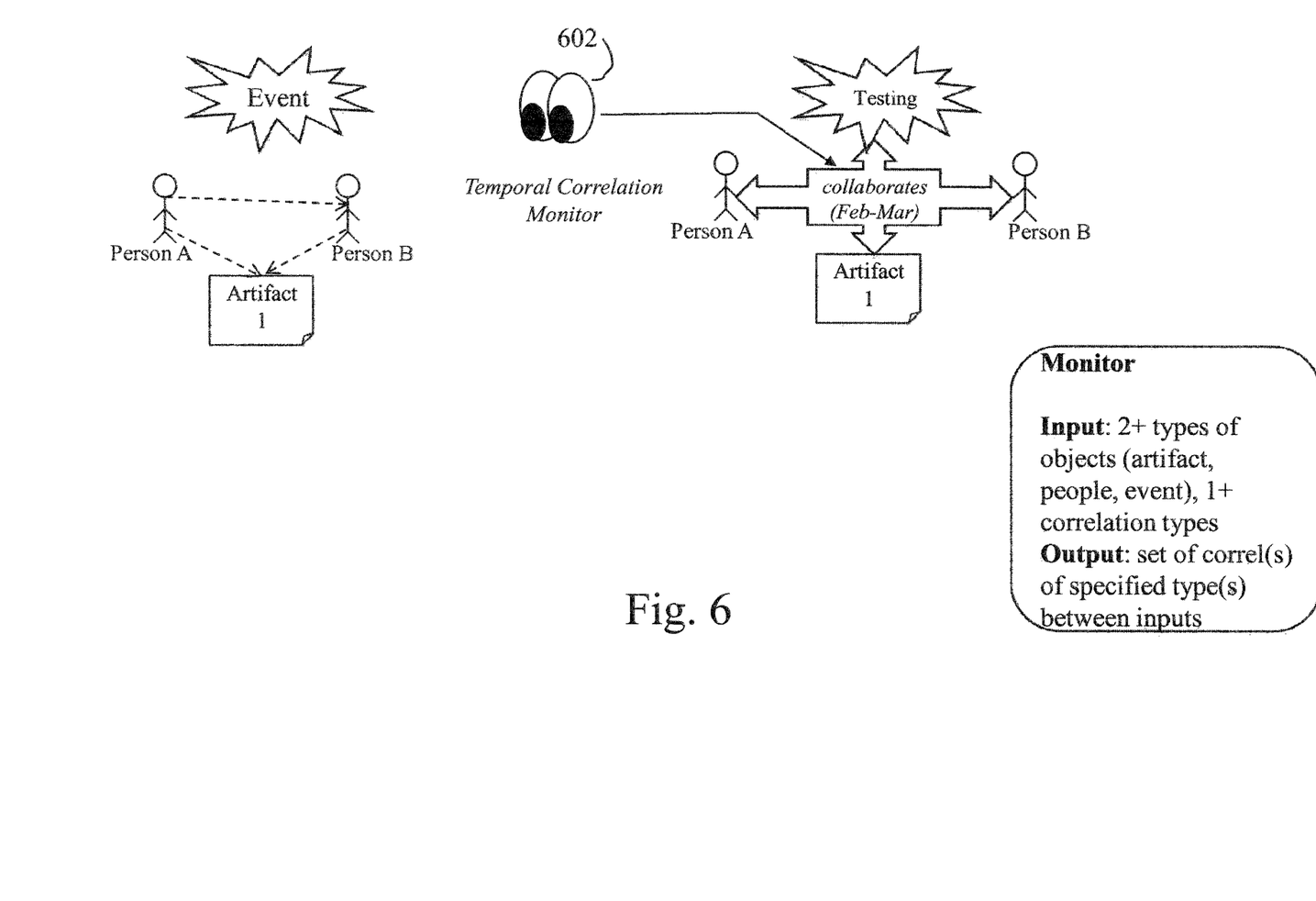
FIG. 6 illustrates correlation-based relationships.

FIG. 6 illustrates correlation-based relationships. Correlation-based relationships are generally time and context sensitive potential associations. This type of relationships may be detected over time, generally based on temporal patterns. A temporal correlation monitor 602 may be employed to observe the behavior of artifacts to discover the correlation-based relationships. For example, it may be observed that 90% of the time when foo( ) is modified, bar( ) is also modified. Thus, it may be concluded that foo( ) and bar( ) have correlation-based relationships. However, correlations may or may not imply existence of relationships. For example, even if "90% of the time, when X looks at Y, X also looks at Z", may only mean that X does not like to look at Y and needs a dose of humor after looking at Y by looking at Z. Thus, such correlation may not mean that Z is related to Y. Further, the presence of a correlation may not suggest a very specific type of relationship, unlike inferred relationship, where an assessor knows what type of relationship it is looking for. For instance, even if correlation-based relationship is discovered that "90% of the time when foo( ) is modified, bar( ) is also modified", that relationship may not specifically tell what relationship foo( ) and bar( ) have to causes them to be modified simultaneously or substantially simultaneously.

Confidence level grows with number of "correct" instances detected, and may be represented by a probability number or distribution.

Lifecycle slicing may be based on an area of concern and context knowledge, e.g., person, role, task, project, and others. A set of relevant static relationship types, inferred relationship types, and correlation types may be selected. These imply a set of expected elements that should be part of a well-formed lifecycle slice. Lifecycle slice may be computed based on these, identifying artifacts, people, events that are in the slice, and artifacts, people, events that are not in the slice but were expected for a well-formed slice.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 3:
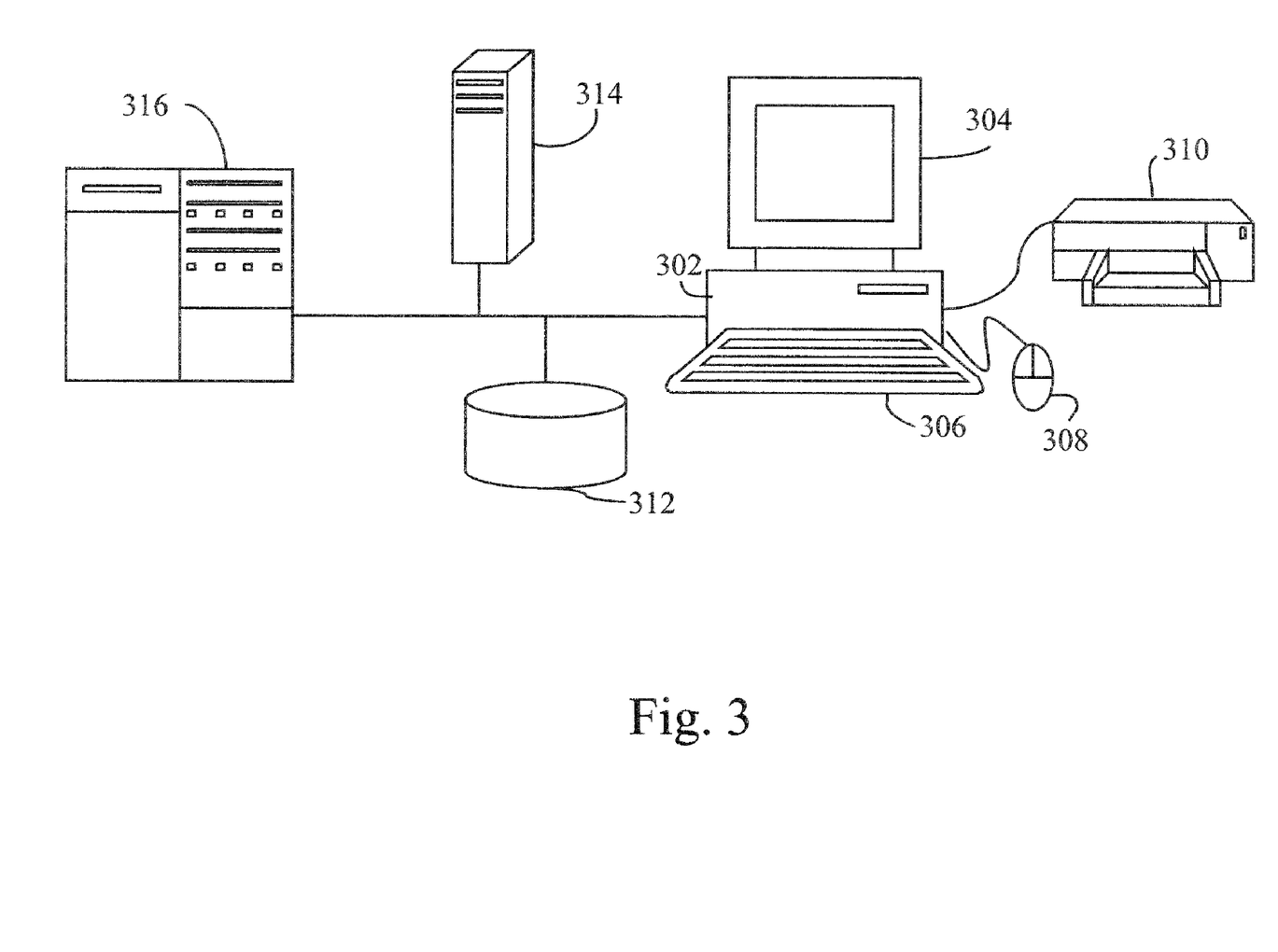
FIG. 3 illustrates an example of a computer system for carrying out systems and methodologies of the present disclosure.

Referring now to FIG. 3, the systems and methodologies of the present disclosure may be carried out or executed in a computer system that includes a processing unit 320, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit 320 by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen 304 for presenting output displays and providing a display through which the user may input data and interact with the processing system, for instance, in cooperation with input devices such as the keyboard 306 and mouse device 308 or pointing device. The computer processing system may be also connected or coupled to one or more peripheral devices such as the printer 310, scanner (not shown), speaker, and any other devices, directly or via remote connections. The computer processing system may be connected or coupled to one or more other processing systems such as a server 310, other remote computer processing system 314, network storage devices 312, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems (e.g., 302, 314, 316), or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A system for providing elements dossiers, comprising:
   one or more memories;
   one or more life cycle records in the one or more memories, each life cycle record describing a life cycle in a work project;
   one or more artifact description records in the one or more memories, each artifact description record describing an artifact in the life cycle, at least one of the artifacts being a dynamic artifact;
   one or more relationship records in the one or more memories, each relationship record describing a relationship between at least two of the artifacts, at least one of the relationship records comprising a dynamically derived relationship; and
   computer module that determines a dossier including one or more relationships associated with a target artifact and all of the relationships associated with one or more other artifacts that have a common path of relationships with the target artifact based on the life cycle records, and artifact description records, and the relationship records wherein the computer module further derives one or more relationships between the target artifact and one or more of the other artifacts that are identified in the life cycle that is non-adjacent to the life cycle of the target artifact, and stores the derived one or more relationships with a derivation history in the one or more memories.

2. The system of claim 1, wherein the target artifact is a set of artifacts.

3. The system of claim 1, further including a dynamic update module operable to update the records in the memory based on the dynamically changing behavior and characteristic of one or more artifacts.

4. The system of claim 1, wherein the computer module determines the relationships recursively creating a set of relationships and artifacts wherein each artifact in the set is connected to another artifact in the set through a path of alternating artifacts and relationships.

5. The system of claim 4, wherein the set of relationships and artifacts is a set including the target artifact and other artifacts that when changed affect the target artifact.

6. The system of claim 4, wherein at least one of the relationships is an inferential relationship.

7. The system of claim 6, wherein the inferential relationship is detected based on similarities in characteristics or behaviors or combination of characteristics and behaviors of the artifacts.

8. The system of claim 6, wherein the inferential relationship is expressed in terms of a probability value representing a confidence level that the inferential relationship exists.

9. The system of claim 4, wherein at least one of the relationships is correlation based.

10. The system of claim 9, wherein the correlation based relationship is time and context sensitive.

11. The system of claim 9, wherein the correlation based relationship is detected based on temporal patterns of artifact behavior and characteristics over time.

12. The system of claim 1, further including a dossier engine that determines a path of alternating artifacts and relationships between any two artifacts in the dossier.

13. The system of claim 12, wherein the dossier engine indicates that one or more dossiers is invalid.

14. The system of claim 1, wherein the work project includes software development project.

15. A method providing elements dossiers, comprising:
retrieving one or more life cycle records from one or more memories, each life cycle record describing a life cycle in a work project;
retrieving one or more artifact description records from the one or more memories, each artifact description record describing an artifact in the life cycle, at least one of the artifacts being a dynamic artifact;
retrieving one or more relationship records from the one or more memories, each relationship record describing a relationship between at least two of the artifacts, at least one of the relationship records comprising a dynamically derived relationship; and
determining a dossier including one or more relationships associated with a target artifact and all of the relationships associated with one or more other artifacts that have a common path of relationships with the target artifact, based on the life cycle records, and artifact description records, and the relationship records wherein the method further includes deriving one or more relationships between the target artifact and one or more of the other artifacts that are identified in the life cycle that is non-adjacent to the life cycle of the target artifact, and storing the derived one or more relationships with a derivation history in the one or more memories.

16. The method of claim 15, wherein the dossier includes the target artifact and other artifacts that are affected by a change in the target artifact.

17. The method of claim 15, wherein the dossier includes at least one correlation based relationship.

18. The method of claim 17, wherein the correlation based relationship is time and context sensitive.

19. The method of claim 17, wherein the correlation based relationship is detected based on temporal patterns of artifact behavior and characteristics over time.

20. A non-transitory program storage device readable by a machine, tangibly embodying a program of instructions executable by the machine to perform a method providing elements dossiers, comprising:
retrieving one or more life cycle records from one or more memories, each life cycle record describing a life cycle in a work project;
retrieving one or more artifact description records from the one or more memories, each artifact description record describing an artifact in the life cycle, at least one of the artifacts being a dynamic artifact;
retrieving one or more relationship records from the one or more memories, each relationship record describing a relationship between at least two of the artifacts, at least one of the relationship records comprising a dynamically derived relationship; and
determining a dossier including one or more relationships associated with a target artifact and all of the relationships associated with one or more other artifacts that have a common path of relationships with the target artifact, based on the life cycle records, and artifact description records, and the relationship records wherein the method further includes deriving one or more relationships between the target artifact and one or more of the other artifacts that are identified in the life cycle that is non-adjacent to the life cycle of the target artifact, and storing the derived one or more relationships with a derivation history in the one or more memories.

21. The non-transitory program storage device of claim 20, wherein the dossier includes the target artifact and other artifacts that are affected by a change in the target artifact.

22. The non-transitory program storage device of claim 20, wherein the dossier includes at least one correlation based relationship.

23. The non-transitory program storage device of claim 22, wherein the correlation based relationship is time and context sensitive.

24. The non-transitory program storage device of claim 22, wherein the correlation based relationship is detected based on temporal patterns of artifact behavior and characteristics over time.

* * * * *